May 22, 1956　　　　D. COMINO　　　　2,746,780
RIGID ANGLE JOINT
Filed Nov. 27, 1951　　　　　　　　3 Sheets-Sheet 1
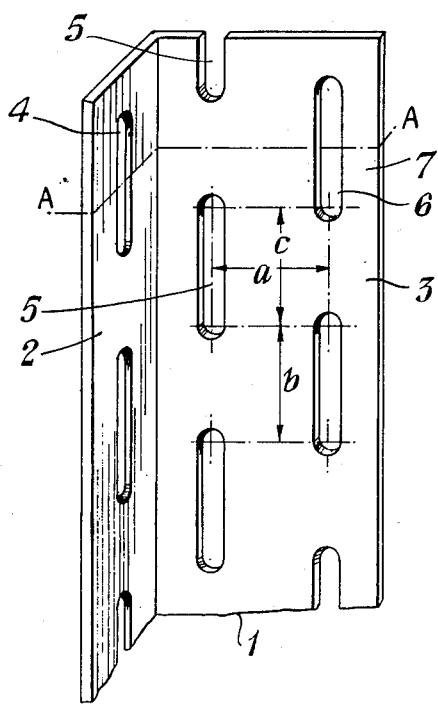
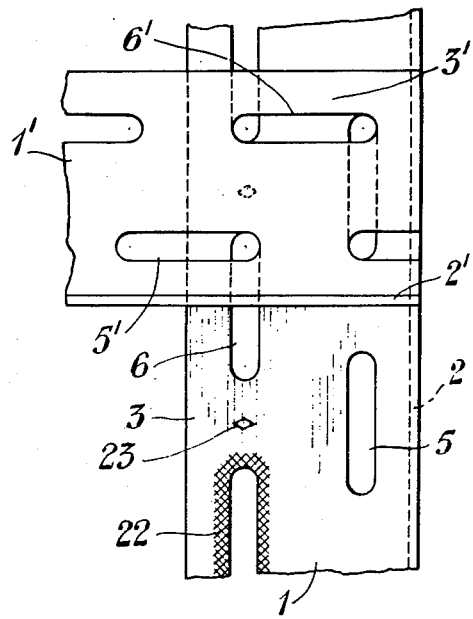
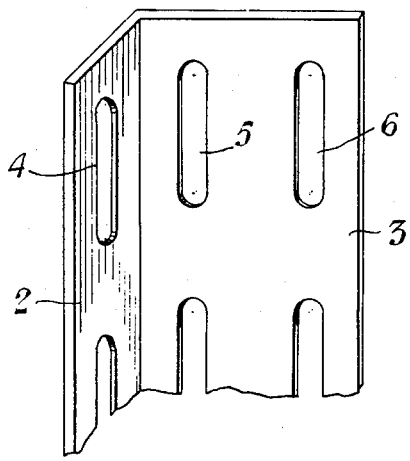
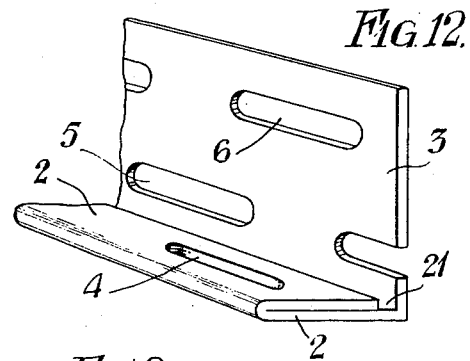
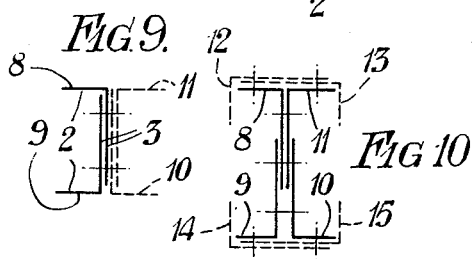
Inventor
Demetrius Comino
by Sommers & Young
Attorneys May 22, 1956  D. COMINO  2,746,780
RIGID ANGLE JOINT
Filed Nov. 27, 1951  3 Sheets-Sheet 2
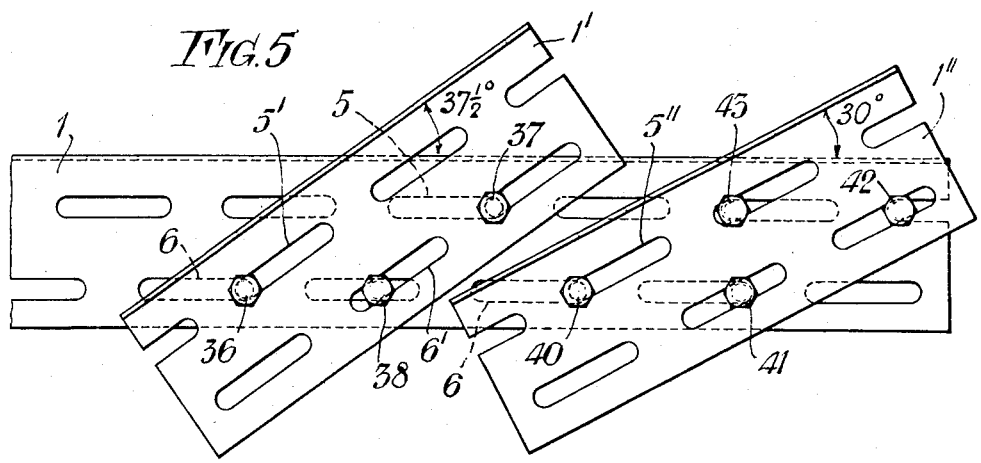
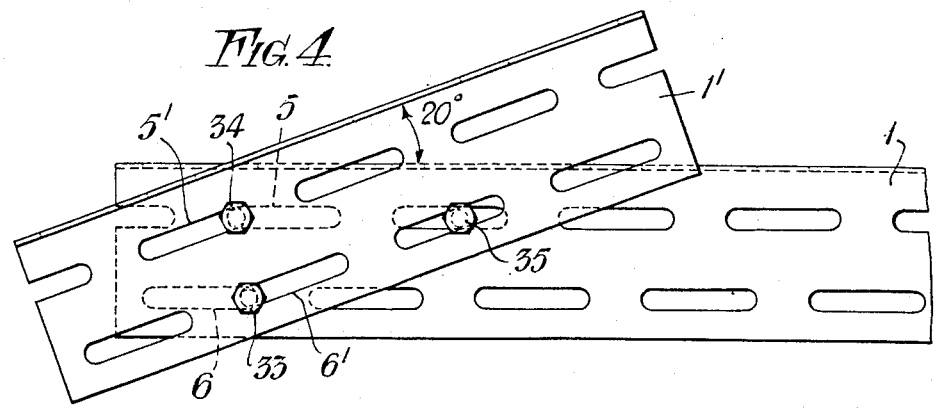
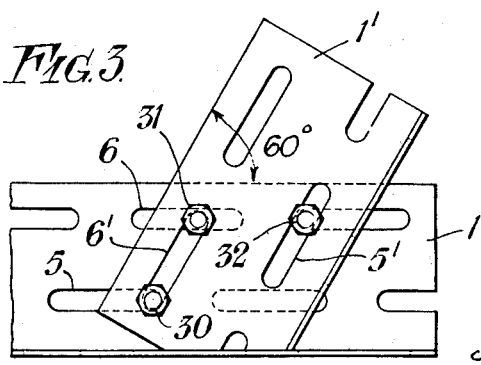
Inventor
Demetrius Comino
by Sommers + Young
Attorneys May 22, 1956  D. COMINO  2,746,780
RIGID ANGLE JOINT
Filed Nov. 27, 1951  3 Sheets-Sheet 3
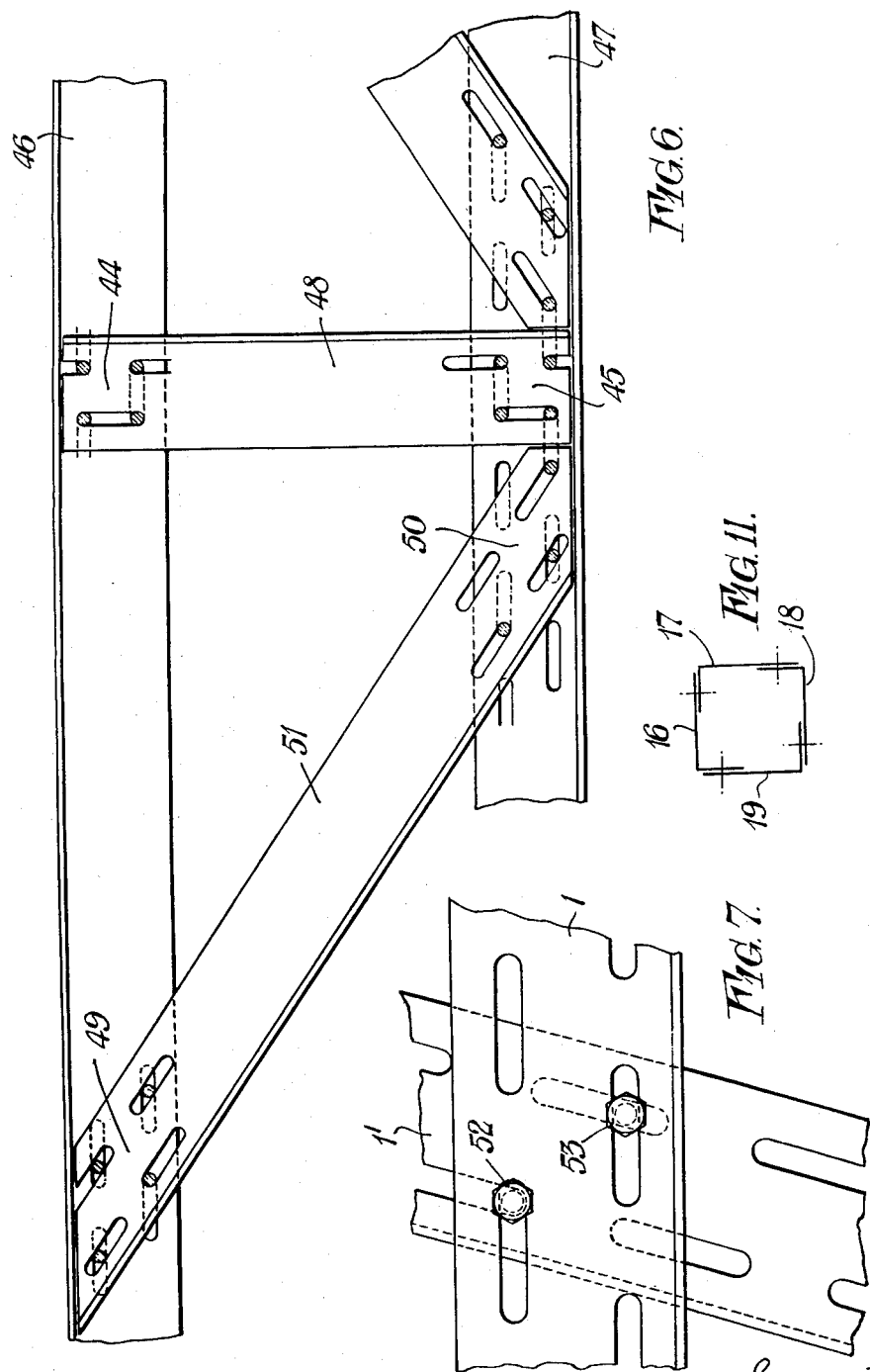
Inventor
Demetrius Comino
by Sommers & Young
Attorneys

# United States Patent Office 2,746,780
Patented May 22, 1956

2,746,780
RIGID ANGLE JOINT

Demetrius Comino, London, England, assignor to Dexion Limited, London, England

Application November 27, 1951, Serial No. 258,361

Claims priority, application Great Britain June 28, 1946

22 Claims. (Cl. 287—54)

This application is a continuation-in-part of application Serial No. 695,103, filed September 6, 1946, now abandoned.

This invention concerns improvements in constructional-element joints and in constructional elements of the kind comprising perforated bars of angle section, especially L-section. These bars, cut to appropriate lengths, can be bolted together to form a variety of frames or structures.

An object of the invention is to provide a constructional-element joint in which the elements can be connected together strongly, rigidly and reliably at any desired angle to each other as well as at right angles or parallel to each other.

A further object of the invention is to provide a form of constructional element which can be connected to another such element strongly, rigidly and reliably at any desired angle as aforesaid.

Thus the invention seeks to increase the adaptability or adjustability of such constructional elements and to provide for the making of a wide variety of strong and rigid joints between possible conjunctions of the elements. A further object of the invention is to enable joints to be made, as far as possible, without the necessity for using brackets, angles, bracing and other auxiliary fittings. Yet a further object is to obviate the necessity for keeping in stock an assortment of different sections of element, one section only being necessary.

Constructional elements and joints in accordance with the invention and various modes of use thereof will now be more fully described by way of example and with reference to the accompanying drawing, in which:

Figure 1 is a perspective view of a preferred form of constructional element,

Figure 2 an elevational view of two such elements to be connected at right angles to each other, Figures 3–5 are elevational views showing elements connected together at angles other than a right angle, Figure 6 is an elevational view showing a plurality of elements connected in a frame, Figure 7 an elevational view of another connection, Figure 8 a perspective view illustrating an alternative, less advantageous, arrangement of slots, Figures 9, 10 and 11 diagrammatic cross-sections of different forms of constructional members built up from the elements, and Figure 12 a perspective view of an alternative form of element.

The preferred and very advantageous form of constructional element shown in Figure 1 consists of an angle member 1 of L-section, one flange 2 being half the width of the other flange 3. Along the centre line of the narrow flange 2 there is formed a single line of regularly spaced longitudinally extending slots 4. Along the wide flange 3 there are formed two parallel lines of similar slots 5, 6. The slots 5, 6 in the wide flange are advantageously staggered in relation to each other and at least one of the lines of slots 5, 6 will then also be staggered in relation to the slots 4 in the narrow flange 2. The arrangement shown in Figure 1, in which the inner line of slots 5 in the wide flange is staggered in relation to the other line of slots 6 and the slots 4 in the narrow flange, the slots 4 and 6 being aligned, has the advantage that the element can be cut, as shown at the top of Figure 1, without leaving a weak tongue at the outer edge of either flange. If the slots 4 and 5 are aligned and the slots 6 staggered, or if the element is cut on a line such as A—A in Figure 1, it will be seen that a narrow unsupported tongue of metal such as 7 is left between at least one slot and the edge of the respective flange.

The centre lines of the slots 5, 6 are spaced a distance $a$ apart substantially equal to one half of the width of the wide flange 3 or to the width of the narrow flange 2, so that each is spaced from a respective side edge by substantially one quarter of the said width. Each slot 4, 5, 6 has semi-circular ends and the dimensions $b$, $c$ hereinafter referred to are to be understood as measured from the centres of the semi-circular ends. The dimension $b$ (the overall length of a slot less its width) is made substantially equal to one half of the width of the wide flange 3, i. e. substantially equal to the dimension $a$, as is also the inter-slot dimension $c$. The distance between the inner edges of the slots 5 and the outer edges of the slot 6 is thus substantially equal to the overall length of a slot, whilst the distance between the adjacent ends of the slots is substantially equal to the overall length of a slot less twice its width.

For most purposes, the width of the narrow flange 2 may conveniently be 1½″ in which case that of the wide flange 3 would be 3″. With the slot disposition of Figure 1, this permits of the element being cut, in the above-described most advantageous manner, at intervals of 3″. The width of the slots 4, 5, 6 appropriate for these dimensions is such as will permit of the insertion, with clearance, of ⅜″ bolts. For the example under consideration, it is preferred to bend up the element from metal about 0.050 to 0.175″ in thickness. If the metal is too thick, difficulties may arise over ensuring slot register with certain combinations of elements.

A slot dimension $b$ of about 1½″ in the above example is sufficient for the making of good joints in the manner hereinafter described, but is not such as appreciably to reduce the strength of the element. Slight variations are naturally possible. The slots could be a little narrower and a little longer, or wider and shorter, and yet afford the necessary overlap and clearance. Sections of other dimensions may be used, but only a few present the same advantages and then only if certain conditions are observed in proportioning the flanges, slots and size of bolts. For example, if the section were 2″ x 1″, the dimension $b$ would have to be approximately 1″ long and the element could only be cut into lengths with all ends uniform, at 2″ intervals. Thus, it would not be convenient to cut at intervals of ¼′ or ¾′ and it would be necessary to use slots for ¼″ bolts because wider slots would unduly weaken the section. Again, if the section were 4″ x 2″ the element could conveniently be cut at intervals of ⅓′, only and could not be handled as easily as the 3″ x 1½″ section.

If one element 1 having the above described staggered disposition of slots 5, 6 in its wide flange 3 be placed at right angles to a similar element 1¹ and with the wide flanges 3, 3¹ in contact with one another, three slots 5, 6 in the one flange 3 can be brought into intersection or overlapping relation with three slots 5¹, 6¹ in the other flange 3¹, thereby forming four bolt holes at the corners of a square (Figure 2). The joint achieved after inserting bolts through these holes and tightening nuts thereon is of great strength and rigidity. As illustrated, the elements 1, 1¹ are arranged back to back and the end of the element $1^1$ lies across the element 1 at a point intermediate of its length. Obviously, the end of the element $1^1$ may be butted against the narrow flange 2 of the element 1 and the elements may be connected at any point, whether at their ends or at a point of intersection intermediate of the lengths of both. In some positions, the wide flange 3 of one element may have to be placed against the narrow flange 2 of another element, in which case two slots 5, 6 of the former will be overlapped or intersected by one or two slots 4 of the latter to provide two bolt holes for the making of a joint.

The elements can also be bolted together at angles other than a right angle and still present the advantage that two or more bolts can be used in each joint. Many such connections can be made by four bolts and very many more by three bolts, whilst connections at all angles can be made by at least two bolts. A few examples are illustrated in Figures 3 to 7.

Figure 3 illustrates a joint which is commonly required, particularly for the connection of bracing members, i. e. a connection at 60°. It will be seen that a very rigid, triangulated, connection can be made between the elements 1, $1^1$ by three bolts 30, 31, 32. Bolt 30 bears at the ends of both of the slots 5, $6^1$ through which it passes and therefore has a particularly effective locking action over and above that secured frictionally by the tightening of its nut. The other, mirror-image, connection at 60° can be similarly made by a mirror-image disposition of three bolts. It will be noted that if the oblique elements had to be displaced upwardly or downwardly, it would always be possible to make a connection with at least two bolts and frequently three bolts.

Figure 4 shows a connection between elements 1, $1^1$ at 20° by three bolts 33, 34, 35. The two bolts 33, 34 bear at the ends of both of the slots, 6, $6^1$ and 5, $5^1$ respectively, through which they pass with the effect referred to above.

Figure 5 shows a connection between elements 1, $1^1$ at 37½° by three bolts 36, 37, 38. The bolts 36, 37 bear at the ends of both of the slots through which they pass. At this angle, it is in some cases possible to make a quadrangular four-bolt connection (as shown in Figure 6) with one bolt at least bearing at the ends of the slots through which it passes.

Figure 5 also shows a connection between elements 1, $1^{11}$ at 30° by four bolts 40, 41, 42, 43, the bolt 40 bearing at the ends of both the slots 6, $5^{11}$ through which it passes.

Even as regards connections between perpendicular or parallel elements, the applicant is not limited to connections at the pitch of the holes. Connections by two bolts at least can be made in any position.

In practice, the relative positions of elements to be connected will often be fixed by joints elsewhere. In spite of such limitations, connections by two bolts at least and often by three or four bolts can be arranged. An example commonly useful in framing is shown in Figure 6. The connections at 44, 45 between the horizontal elements 46, 47 and the vertical strut element 48 are each made by four bolts. The connections at 49, 50 to the diagonal bracing element 51 can be made by four bolts (one bearing at both slot ends) at one end (49) and by three bolts (two bearing at both slot ends) at the other (50). It will be seen that connections of great rigidity can be made to the diagonal element 51, which is at 37½°. in spite of the fact that the positions in space of the parallel elements 46, 47 are completely fixed so that, once one end of the diagonal member is fixed, the coincidence of slots at the other end has to be accepted as it is found.

Figure 7 illustrates one example at random of a connection by only two bolts 52, 53 between elements 1, $1^1$.

Elements of the kind described are suitable for building all kinds of structures, among which may be mentioned frames, stands, racks, benches, trolleys, panels, scaffolding and small buildings. Also, they are suitable for building up a variety of structural members appropriate for the stresses expected in particular cases, i. e. tension, compression, bending and so on. Girders, box girders and beams or pillars of various cross sectional profiles can be produced by appropriate assembly and bolting together of the elements and, without keeping more than one kind of section in stock, a large variety of constructional possibilities is immediates available. A few examples of such possibilities may be given: As illustrated in Figure 9, a channel may be formed by laying the wide flange 3 of one element 8 along the wide flange 3 of another element 9 and bolting them together, the narrow flanges 2 forming the sides of the channel. The addition of another pair of elements 10, 11 produces a double channel or I section. Two elements bolted together in the positions of the elements 8, 10 provide a Z section and, in the positions of the elements 8 and 11, a T section. In each of the two pairs of elements 8, 9 and 10, 11 in Figure 9, the end of the wide flange of one element is abutted against the narrow flange of the other element and the I section produced is shallow. If, however, the members of each pair 8, 9 and 10, 11 are arranged and bolted as shown in Figure 10, a deeper I section is produced. Four elements 12, 13, 14, 15 can be added, if desired, to produce a double T with flanges at the edges of the cross members. Four elements 16, 17, 18, 19 can be arranged each with its wide flange overlapping the narrow flange of another element to produce a box girder as shown in Fig. 11. None of the connections requires brackets or angle or other auxiliary fittings.

A flooring, wall or ceiling structure can be improvised from the elements by arranging them with the wide flanges 3 shingled over one another. Also such surfaces, as well as other structures, such as shelving can be very effectively built up from a frame work of the elements and separate shelves.

As illustrated in Figure 8, the slots 4, 5, 6 might alternatively be arranged in transverse alignment. With this modification, however, some of the advantages of the staggered slot-arrangement described with reference to Figures 1–7 would be sacrificed.

An alternative form of element may have two flanges each of the width of the wide flange 3 and each with two lines of slots 5, 6. However, elements formed with one narrow flange 2 are more convenient for handling and the narrow flange offers a minimum of obstruction when shelving and other structures are formed from the elements. In a further alternative form, the element may be of channel shape with, for example, a web with two lines of slots and of the dimensions of the wide flange 3 and flanges each with one line of slots and of the dimensions of the narrow flange 2.

For additional strength and stiffness the narrow flange 2 of an element may be folded as illustrated in Figure 12 to give a double thickness, the folding being preferably inwards towards the wide flange 3, and the edge of the folded part being spaced a little (for example slightly less than twice the metal thickness) from the face of the said flange 3, as indicated at 21. This allows such elements to be fitted closely together in the making of several kinds of joints, as the double thickness of the flange 2 of one element is able to fit into the gap 21 of another.

For some purposes, it may be advantageous to have the marginal edges of the slots roughened or knurled as indicated at 22 in Figure 2, say to a width of ⅛″ or 1/16″ around each slot, so as slightly to increase the frictional hold of bolt heads and nuts when tightened and thus prevent slipping when two elements are bolted together. Or the elements may be made of a rough-surfaced metal with the same object. Cutting marks may be provided at intervals (3″ intervals for the 3″ x 1½″ elements) so that the user may be assisted in cutting accurate lengths from stock lengths and also in cutting at the optimum position, i. e. through the middle of a slot 5 as at the upper end of Figure 1.

Elements in accordance with the invention need suffer no damage or depreciation in erection and use and elements retrieved from a dismantled structure can be used again for any purpose for which they are required.

Apart from its application to members for full-scale structures, the invention can also be used in members of constructional toys.

I claim:

1. A constructional-element joint comprising two constructional elements, each of which includes, in cross section, two legs at right angles to each other and each of which is provided, in one of the said legs, with two laterally spaced, longitudinally extending, series of identical longitudinally elongated holes, the distance from the outer edges of the holes of the outer of said two series of holes to the inner edges of the holes of the inner of said two series being substantially equal to the overall length of the holes while the distance between the adjacent ends of consecutive holes of each series is substantially equal to the overall length of the holes less twice their width, a plurality of connecting members having shafts extending through holes of the two series in legs of respective elements for connecting said construction elements together, the aforesaid relative positions and dimensions of said holes enabling the connection of said members to be made with their axes arranged at any desired angle.

2. A constructional-element joint comprising two constructional elements, each of which includes, in cross section, two legs at right angles to each other and each of which is provided, in one of the said legs, with two laterally spaced, longitudinally extending, series of identical longitudinally elongated holes, the distance from the outer edges of the holes of the outer of said two series of holes to the inner edges of the holes of the inner of said two series being substantially equal to the overall length of the holes while the distance between the adjacent ends of consecutive holes of each series is substantially equal to the overall length of the holes less twice their width, at least three connecting members having shafts extending through holes of the two series in legs of respective elements for connecting said constructional elements together the aforesaid relative positions and dimensions of said holes enabling the connection of said members to be made with their longitudinal axes arranged at an angle to each other, and at least one of said shafts being in bearings at ends of two of said holes to positively prevent angular displacement of the elements.

3. A constructional-element joint comprising two elongated constructional elements each of L-shaped cross-section, one of the legs of said L-section being of greater length than the other laterally of the long dimension of the element, the narrower leg being provided with a single series of elongated holes extending longitudinally of the element, the wider of said legs having two series of elongated holes extending longitudinally of the element, said two series of holes being spaced apart laterally, the holes of each of said two series being spaced apart longitudinally, and the holes of said two series being in staggered relation to the respective holes of the other of said two series, the end portions of the respective holes of said two series overlapping each other by an amount substantially equal to the width of the holes, and the distance from the outer edges of the holes of the outer of said two series to the inner edges of the holes of the inner of said two series being substantially equal to the length of said holes, the wider legs of the two elements being placed together at an angle to each other and connected together by bolts passed through holes of the two series which provide openings extending through both elements.

4. A constructional-element joint according to claim 3, wherein the distance from holes of the inner series of elongated holes to the narrower leg is at least as great as the distance from the holes of the outer series of holes to the outer edge of the wider leg of the L-section.

5. A constructional-element joint comprising two elongated constructional elements each of whose cross-sections comprises two legs at right angles, one such leg being provided with a series of holes extending longitudinally of the element, the holes being elongated longitudinally of the element, and another such leg being provided with two laterally spaced, longitudinally extending, series of identical longitudinally elongated holes, the distance from the outer edges of the holes of the outer of said two series of holes to the inner edges of the holes of the inner of said two series being substantially equal to the overall length of the holes whilst the distance between the adjacent ends of consecutive holes of each series is substantially equal to the overall length of the holes less twice their width, the second-named legs of the two elements being placed together at an angle to each other and bolts connecting said elements together, said bolts passing through holes of the two series which provide openings extending through both elements.

6. A joint in accordance with claim 5, in which the holes of the said two series in the one leg are in staggered relation to each other, the end portions of the respective holes of the said two series overlapping each other by an amount substantially equal to the width of the holes.

7. A joint in accordance with claim 5, in which the holes of the said two series in the one leg are in staggered relation to each other, the end portions of the respective holes of the said two series overlapping each other by an amount substantially equal to the width of the holes, whilst the holes of the series in the other leg are aligned transversely with the holes of the outer of the said two series.

8. A joint in accordance with claim 5, in which each element has an L-shaped cross-section, the leg of the L provided with the two series of holes being substantially twice as wide as the other leg, which is provided with a single series of holes only.

9. A joint in accordance with claim 5, in which the distance between the centre line of each series of the two series of holes and the nearer edge of the leg provided with the said two series of holes is substantially equal to one quarter of the width of the said leg.

10. An elongated structural element of L-shaped cross-section, one of the legs of said L-section being of greater length than the other laterally of the long dimension of the element, the narrower leg being provided with a single series of elongated holes extending longitudinally of the element, the wider of said legs having two series of elongated holes extending longitudinally of the element, said two series of holes being spaced apart laterally, the holes of each of said two series being spaced apart longitudinally, and the holes of said two series being in staggered relation to the respective holes of the other of said two series, the end portions of the respective holes of said two series overlapping each other by an amount substantially equal to the width of the holes, and the distance from the outer edges of the holes of the outer of said two series to the inner edges of the holes of the inner of said two series being substantially equal to the length of said holes, so that when the wider legs of two elements are placed together for constructional assembly the holes of the two series provide openings extending through both elements for reception of connecting devices.

11. An elongated structural element of L-shaped cross-section, one of the legs of said L-section being of greater length than the other laterally of the long dimension of the element, the narrower leg being provided with a single series of elongated holes extending longitudinally of the element, the wider of said legs having two series of elongated holes extending longitudinally of the element, said two series of holes being spaced apart laterally, the holes of each of said two series being spaced apart longitudinally, and the holes of said two series being in staggered relation to the respective holes of the other of said two series, the end portions of the respective holes of said two series overlapping each other by an amount substantially equal to the width of the holes, the distance from the outer edges of the holes of the outer of said two series to the inner edges of the holes of the inner of said two series being substantially equal to the length of said holes, so that when the wider legs of two elements are placed together for constructional assembly the holes of the two series provide openings extending through both elements for reception of connecting devices, the distance from holes of the inner series of holes to the narrower leg being at least as great as the distance from the holes of said outer series of holes to the outer edge of the wider leg of the L-section.

12. An elongated structural element whose cross-section comprises two legs at right angles, one such leg being provided with a series of holes extending longitudinally of the element, the holes being elongated longitudinally of the element, and another such leg being provided with two laterally spaced, longitudinally extending, series of identical longitudinally elongated holes, the distance from the outer edges of the holes of the outer of said two series of holes to the inner edges of the holes of the inner of said two series being substantially equal to the overall length of the holes whilst the distance between the adjacent ends of consecutive holes of each series is substantially equal to the overall length of the holes less twice their width.

13. A structural element in accordance with claim 12, in which the holes of the said two series in the one leg are in staggered relation to each other, the end portions of the respective holes of the said two series overlapping each other by an amount not less than and substantially equal to the width of the holes.

14. A structural element in accordance with claim 12, in which the holes of the said two series in the one leg are in staggered relation to each other, the end portions of the respective holes of the said two series overlapping each other by an amount not less than and substantially equal to the width of the holes, whilst the holes of the series in the other leg are aligned transversely with the holes of the outer of the said two series.

15. A structural element in accordance with claim 12, in which the element has an L-shaped cross-section, the leg of the L provided with the two series of holes being substantially twice as wide as the other leg, which is provided with a single series of holes only.

16. A structural element in accordance with claim 12, in which the distance between the centre line of each series of the two series of holes and the nearer edge of the leg provided with the said two series of holes is substantially equal to one quarter of the width of the said leg.

17. A structural bar element composed of two flanges arranged substantially at a right angle providing said element with an L-shaped cross section, one of said flanges having a section longitudinally extending series of longitudinally elongated holes formed therein, the other of said flanges having two parallel series of such holes, the length of said elongated holes being such as to be capable of receiving near their respective ends bolts spaced from each other at the same interval as the transverse interval between said two series of holes and the longitudinal interval between the holes in said series of holes being such that consecutive holes are capable of receiving near their adjacent ends bolts spaced from each other at the same interval as the transverse interval between said two series.

18. An element according to claim 17, wherein the elongated holes of the two series are disposed in staggered overlapping relation.

19. An element according to claim 17, wherein the two series of holes are spaced from the respectively adjacent edges of the flange in which they are provided by about half the transverse interval between them.

20. An element according to claim 17, wherein the other flange has a single series of holes spaced from its edges by about half the transverse interval between the series of holes in the said one flange having the two series of holes.

21. An element according to claim 18, wherein the other flange has a single series of holes transversely aligned with the outer of the two series of holes in the said one flange having two series of holes.

22. A structural bar element of L-shaped cross section with longitudinally extending series of longitudinally elongated holes in each flange, one flange having two parallel series of such holes, the length of the elongated holes being such that, when the flange with two series of holes has the same flange of a like element disposed across it at right angles, it is capable of receiving near the ends of its holes bolts which are passed also through holes in the said other flange near the ends of the latter holes and are located at the corners of a square whose side is equal to the transverse interval between the said two series of holes.

References Cited in the file of this patent

UNITED STATES PATENTS

| | | |
|---|---|---|
| 1,589,827 | Wessel | June 22, 1926 |
| 1,677,796 | Parks | July 17, 1928 |
| 1,699,697 | Hilpert et al. | Jan. 22, 1929 |
| 1,820,660 | Gilbert | Aug. 25, 1931 |
| 1,857,326 | Patterson | May 10, 1932 |
| 2,152,189 | Henderson | Mar. 28, 1939 |
| 2,301,306 | McDonald | Nov. 10, 1942 |
| 2,339,515 | Parcher | Jan. 18, 1944 |
| 2,632,533 | MacKenzie | Mar. 24, 1953 |

FOREIGN PATENTS

| | | |
|---|---|---|
| 366,256 | Italy | Dec. 22, 1938 |
| 520,081 | France | Feb. 6, 1921 |
| 620,696 | Great Britain | Mar. 29, 1948 |
| 910,799 | France | Feb. 18, 1946 |